(12) United States Patent
Rittman et al.

(10) Patent No.: US 11,663,167 B2
(45) Date of Patent: *May 30, 2023

(54) SYSTEMS AND METHODS OF MOBILE DATABASE MANAGEMENT AND SHARING

(71) Applicant: GBT Technologies Inc., Santa Monica, CA (US)

(72) Inventors: Danny Rittman, San Diego, CA (US); Aliza Schnapp, Beverly Hills, CA (US)

(73) Assignee: GBT Technologies Inc., Santa Monica, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/104,001

(22) Filed: Nov. 25, 2020

(65) Prior Publication Data

US 2021/0081368 A1  Mar. 18, 2021

Related U.S. Application Data

(63) Continuation of application No. 16/155,093, filed on Oct. 9, 2018, now Pat. No. 10,853,327.

(Continued)

(51) Int. Cl.
*G06F 16/176* (2019.01)
*G06F 21/57* (2013.01)

(52) U.S. Cl.
CPC .......... *G06F 16/176* (2019.01); *G06F 21/575* (2013.01)

(58) Field of Classification Search
CPC .... G06F 16/176; G06F 21/575; G06F 16/172; G06F 16/182; G06F 11/1469; G06F 2201/80; G06F 21/606

(Continued)

(56) References Cited

U.S. PATENT DOCUMENTS 10,853,182 B1 * 12/2020 Vig .................. G06F 16/23
2001/0005849 A1  6/2001 Boothby et al.
(Continued)

OTHER PUBLICATIONS

International Search Report and Written Opinion dated Jul. 29, 2019 in related International Application No. PCT/US2019/032343.

*Primary Examiner* — Kuen S Lu
(74) *Attorney, Agent, or Firm* — Eric L. Lane; Green Patent Law

(57) ABSTRACT

Systems and methods of mobile database management and sharing are provided which include at least one mobile database and a first electronic circuit in communication with the mobile database. The system segments the mobile database into a plurality of database segments and indexes the plurality of database segments. The system sends one or more of the plurality of database segments to a second electronic circuit over a private secured communication protocol. One or both of the first and second electronic circuit may be housed within one or more mobile devices. Disclosed systems and methods include processing a database sharing request received from at least one mobile device wherein the database sharing request requests sharing of one or more of the plurality of database segments. A mobile device containing a database management and sharing system is also provided which includes a shared mobile database and one or more proxy entities related to the shared mobile database. At least some of the plurality of database segments are sent via the one or more proxy entities to one or more separate mobile devices and stored in the mobile device and the one or more separate mobile devices.

17 Claims, 12 Drawing Sheets

Related U.S. Application Data

(60) Provisional application No. 62/676,393, filed on May 25, 2018.

(58) Field of Classification Search
USPC .......................................................... 707/758
See application file for complete search history.

(56) References Cited

U.S. PATENT DOCUMENTS

| | | | |
|---|---|---|---|
| 2003/0072467 A1 | 4/2003 | Brundage | |
| 2006/0173850 A1* | 8/2006 | Auer | G06F 16/273 |
| 2009/0024678 A1* | 1/2009 | Milby | G06F 3/067 |
| | | | 711/170 |
| 2009/0030911 A1* | 1/2009 | Guo | G06F 16/40 |
| 2009/0082051 A1* | 3/2009 | Ruotsi | H04L 67/303 |
| | | | 455/519 |
| 2011/0047146 A1* | 2/2011 | Scott | G06F 16/20 |
| | | | 707/E17.109 |
| 2012/0323923 A1 | 12/2012 | Duan | |
| 2013/0013675 A1 | 1/2013 | Lacapra et al. | |
| 2013/0127617 A1* | 5/2013 | Baade | G08B 13/06 |
| | | | 340/539.31 |
| 2015/0028996 A1* | 1/2015 | Agrafioti | G06F 21/40 |
| | | | 340/5.82 |
| 2015/0059003 A1 | 2/2015 | Bouse | |
| 2015/0350299 A1* | 12/2015 | Pineas | H04W 4/50 |
| | | | 709/203 |
| 2016/0105518 A1* | 4/2016 | Rosenshine | H04M 3/42382 |
| | | | 709/206 |
| 2017/0061138 A1* | 3/2017 | Lambert | H04L 63/18 |
| 2017/0195839 A1 | 7/2017 | Rittman | |

* cited by examiner

SYSTEMS AND METHODS OF MOBILE DATABASE MANAGEMENT AND SHARING

CROSS-REFERENCE TO RELATED APPLICATIONS

This application is a continuation of and claims priority to U.S. patent application Ser. No. 16/155,093, filed Oct. 9, 2018, issued as U.S. Pat. No. 10,853,327 on Dec. 1, 2020, which is a non-provisional of and claims priority to U.S. Patent Application No. 62/676,393, filed May 25, 2018, each of which is hereby incorporated by reference in its entirety.

FIELD

The present disclosure relates to systems and methods of mobile database management and sharing and, more particularly, to database sharing methods of synchronizing data used in mobile devices.

BACKGROUND

File sharing, and data management in general, is becoming a major challenge in today's world. With all of the various types of files on different devices such as personal computers, personal digital assistants, or mobile devices, the management of data in an efficient manner from device-to-device is a challenge for users, for mobile service providers, and mobile devices designers/manufacturers.

Many applications require the ability to download information from an information repository and operate on this information even when out of range or disconnected. An example of this is your contacts and calendar on the phone. In this scenario, a user would require access to update information from files in the home directories on a server or customer records from a database. This type of access and work load generated by such users is different from the traditional workloads seen in client-server systems of today.

Mobile users must be able to work without a network connection due to poor or even non-existent connections. A cache could be maintained to hold recently accessed data and transactions so that they are not lost due to connection failure. Users might not require access to truly live data, only recently modified data, and uploading of changing might be deferred until reconnected.

Other issues that arise in this context are that bandwidth must be conserved (a common requirement on wireless networks that charge per megabyte or data transferred); mobile computing devices tend to have slower CPUs and limited battery life; and users with multiple devices (e.g. smartphone and tablet) need to synchronize their devices to a centralized data store. This may require application-specific automation features. In addition, users may change location geographically and on the network. Usually, dealing with this is left to the operating system, which is responsible for maintaining the wireless network connection.

In the context of data files in general, files worked on at one location by a user may not be accessible from a device at another location. For example, a user working at home may have files left there on a home computer that are not accessible from a computer at work. Data on one device may be lost because the user failed to regularly back-up the data files on the device. In other situations, short of forwarding each file or email to another account, switching accounts with an internet service provider may cause a user to lose their emails and other personal files resident on that ISPs server. All of these problems with data portability, management, and access create inefficiencies for a user.

Some known systems have tried to address these issues. In the photo sharing context, websites have allowed users to load files to the website to share among multiple devices and multiple users. This does allow some access to images when the user is not at his/her home computer and to share photos with users at remote locations. The sharing of files, however, among multiple users, especially over mobile devices is typically limited to low-resolution versions of the original images, and this sharing of lower quality files may cause a user difficulty in viewing the image.

Additionally, there is no data persistence as the files on the server may be deleted after a certain period of inactivity. In systems where users use peer-to-peer sharing or email picture files to each other, images may be lost or hard to track down because the original email was lost or poorly organized among the users' files. Additionally, dynamic updating of shared files is not present. The data or file is copied one time and is then static on the sharee's system.

Currently, mobile data capture devices (MDCD) are used to capture data. Mobile data capture devices may include, for example, cellular telephones, personal digital assistants (PDAs), digital cameras, digital video recorders, and so on. MDCDs are used in different environments and in different industries to capture, store, and process different types of data. Users may desire to take actions including querying, managing, and protecting the data captured on the MDCD. However, MDCDs have typically been limited in the actions that they can perform. Typically, many actions related to database management have only been available at the local mobile device level which is dependent on the device memory and storage options.

In view of the issues discussed above, there is a need for systems and methods that provide the ability to download information from an information repository and operate on this information even when out of range or disconnected. There is a need for a mobile database that can store information while conserving bandwidth. There is also a need for a mobile database that that allows files worked on at one location by a user to be accessible from a device at another location. Finally, there is a need for mobile database sharing and management systems that provide data persistence and dynamic updating of shared files.

SUMMARY

The present disclosure, in its many embodiments, alleviates to a great extent the disadvantages of known systems and methods of database management and sharing by providing database management and sharing for mobile devices, over a private, secured communication protocol. Disclosed systems and methods whereby a mobile database is segmented and indexed and one more database segments may be sent among electronic circuits in mobile devices over a private secured communication protocol. A mobile database is either a stationary database that can be connected to by a mobile computing device (e.g., smartphones and PDAs) over a mobile network, or a database which is actually stored by the mobile device. This could be a list of contacts, price information, distance travelled, or any other information. Systems and methods described herein offer a breakthrough, new concept of database management and sharing over a private, secured and encrypted network.

The described methods and systems are based on a proprietary Integrated Circuit (IC) and a mobile software application to split database objects to segments and sharing them among other mobile devices. These segments are sent via private, secured channel to be stored on mobile devices worldwide and are indexed for restoration purposes. Upon the user's request to restore the database item, the system collects all database segments from all devices, worldwide and assembles them together to restore the database object. These actions are done in real time and are transparent for the user. Systems and methods maintain a database item's backup on a fire-proof central backup server for immediate restore.

Disclosed systems, methods, and mobile software application provide mobile database management and sharing over private, secured network, in real time. Exemplary embodiments manage databases of all types including but not limited to media, textual, graphical and secured communication information. Disclosed systems and methods work with proprietary integrated circuits (IC) within mobile devices. Working together with the IC and the mobile software application, the systems and methods share all mobile database types with all other, same mobile ICs that are installed on other mobile devices, worldwide, via its own private, secured, encrypted protocol.

Exemplary embodiments divide the database into numerous segments, according to an algorithm, and share them among all other proprietary mobile devices ICs, worldwide, via its network. In exemplary embodiments, each database segment is encrypted and indexed. Then it is stored in the mobile device's memory, controlled by the system within the proprietary IC and the application software. The systems and methods keep records of all database segments and collect them to the individual mobile device upon user's request in order to restore the database item. The systems and methods may spread all databases across its private, secured network, worldwide, transparent for the user.

Exemplary embodiments perform constant memory optimization to constantly maintain the optimum free mobile device memory and share it with other mobile devices database segments. The systems and methods move database segments dynamically, according to priority, between mobile devices, worldwide. The database segmentation and allocation are done according to mobile service bandwidth, mobile device memory capacity and performance. The systems and methods keep backups for all database items on a central server.

An important advantage of disclosed embodiments is efficient mobile device memory utilization at all times. With this system mobile devices memories will be freed for more utilization, the power consumption will be reduced, and the mobile device processing capabilities dramatically increased. In addition, disclosed embodiments enable better utilization of the mobile provider band width and data packaging for user's enjoyment, worldwide.

Exemplary embodiments of a mobile database management and sharing system comprise at least one mobile database and a first electronic circuit in communication with the mobile database. The electronic circuit includes a controller, a secured basic input/output (BIOS) system, a memory unit, a radio unit, and an antenna. The system segments the mobile database into a plurality of database segments, the system indexes the plurality of database segments, and the system sends one or more of the plurality of database segments to a second electronic circuit over a private secured communication protocol. In exemplary embodiments, one or both of the first and second electronic circuit is an integrated circuit, and one or both of the first and second electronic circuit may be housed within one or more mobile devices.

In exemplary embodiments, the mobile database management and sharing system further comprises a database management logic in communication with the mobile database for analyzing and processing data received from the first electronic circuit. The system may further comprise a circuit logic in communication with the mobile database for performing optimization of allocation of the plurality of database segments. In exemplary embodiments, the system further comprises a circuit control logic in communication with the mobile database for adjusting database segmentation and send and receive parameters. The plurality of database segments may be encrypted and stored on one more mobile device memories in the one or more mobile devices. In exemplary embodiments, the system further comprises a database assembly logic in communication with the mobile database configured to communicate with the one or more mobile devices to collect and assemble the mobile database using one or more private channels in parallel to sending the one or more of the plurality of database segments. The system may also include cloud software in communication with the system.

Exemplary methods of mobile database management and sharing comprise processing data received from at least one mobile device containing at least one electronic circuit, segmenting a mobile database into a plurality of database segments, indexing the plurality of database segments, and processing a database sharing request received from at least one mobile device. The database sharing request requests sharing of one or more of the plurality of database segments, and exemplary methods further comprise sending the one or more of the plurality of database segments requested to at least one mobile device over a private secured communication protocol. Exemplary systems and methods work in real-time.

In exemplary embodiments, methods of mobile database management and sharing further comprise communicating the database sharing request to a central server and communicating database data to the central server in parallel with the database sharing request. Methods may further comprise receiving a reply to the database sharing request from the central server. Exemplary methods include running back-end software on a central server, and the back-end software may include artificial intelligence. In exemplary embodiments, methods of mobile database management and sharing further running an error protocol and upon detecting an error, recovering data, repeating the segmentation step, and repeating the sending step.

In exemplary embodiments, a mobile device containing a database management and sharing system is provided comprising a shared mobile database, one or more proxy entities related to the shared mobile database, and an electronic circuit in communication with the shared mobile database and the one or more proxy entities. The electronic circuit includes a controller, a secured basic input/output (BIOS) system, a memory unit, a radio unit, and an antenna. The mobile device further comprises mobile software executed and running on the mobile device. The database management and sharing system segments the shared mobile database into a plurality of database segments and indexes the plurality of database segments. In exemplary embodiments, at least some of the plurality of database segments are sent via the one or more proxy entities to one or more separate mobile devices and stored in the mobile device and the one or more separate mobile devices.

In exemplary embodiments, the plurality of database segments is also stored on a central server. In exemplary embodiments, the one more proxy entities maintain processing requests in a queue. The shared mobile database may contain a partial database of a whole database contained and managed by the database management and sharing system. The mobile software may contain artificial intelligence.

Exemplary methods of sharing data comprise generating a database sharing request received from at least one mobile device, the database sharing request relating to data in a mobile database, determining that the database sharing request is processed by the mobile database, communicating the database sharing request to a central server, communicating database data to the central server in parallel with the database sharing request, and receiving a reply to the database sharing request from the central server. Exemplary methods further comprise encrypting the database data and storing the database data on one more mobile device memories in one or more mobile devices.

Accordingly, it is seen that systems and methods of database management and sharing are provided. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

Figure 1:
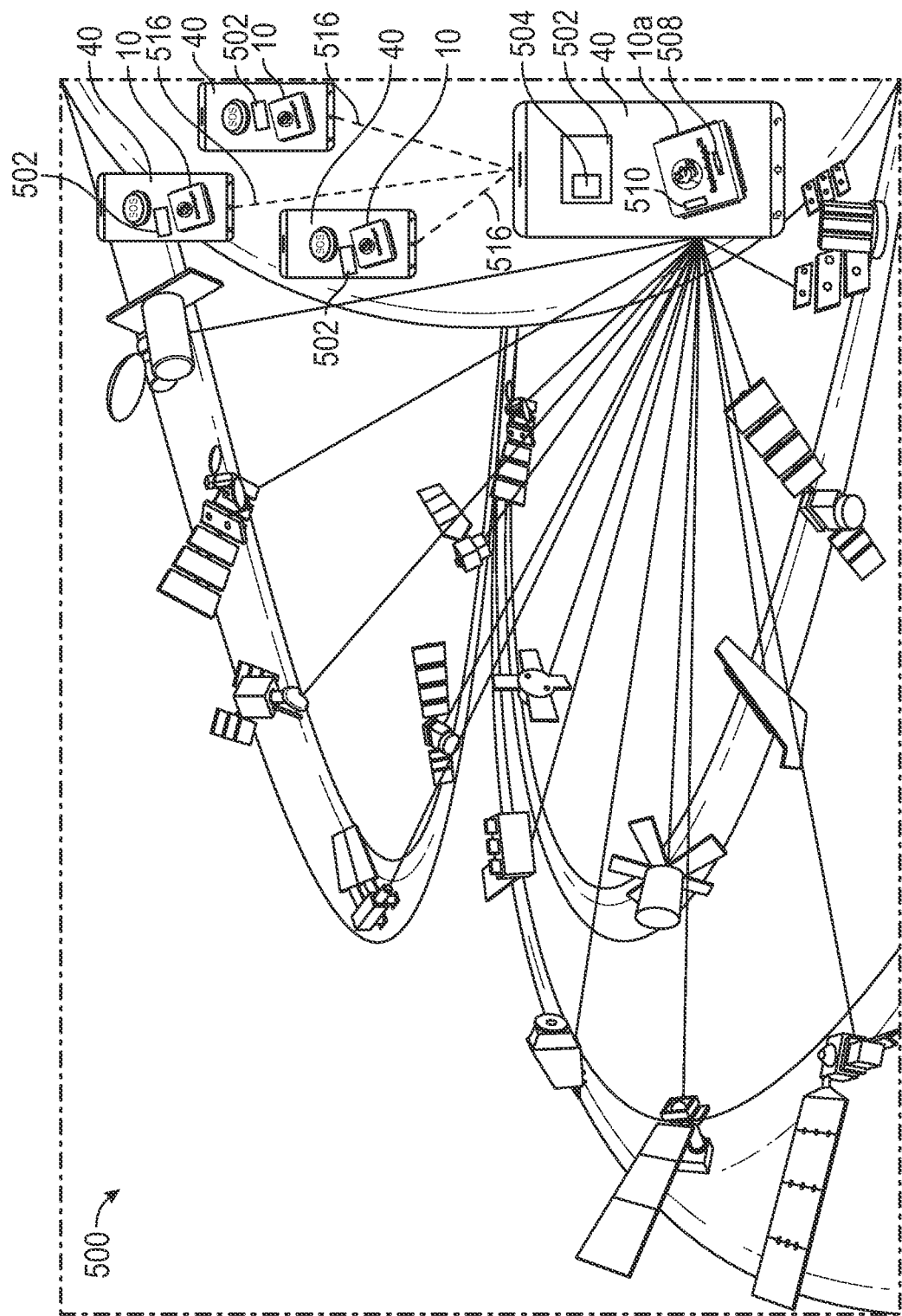
FIG. 1 is a schematic of an exemplary embodiment of a mobile database management and sharing system in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures do not show every piece of equipment, nor the materials, configurations, and directions of the various circuits and communications systems.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take many forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software in execution, and/or combinations of each to perform a function(s) or an action(s), and/or to cause a function or action from another logic, method, and/or system. Logic may include a software-controlled microprocessor, discrete logic (e.g., an application specific integrated circuit (ASIC)), an analog circuit, a digital circuit, a programmed logic device, a memory device containing instructions, and so on. Logic may include a gate(s), combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Mobile Software Application", as used herein, includes but is not limited to, one or more computer or processor instructions in execution that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software, whether an entire system or a component of a system, may be embodied as an article of manufacture and maintained or provided as part of a computer-readable medium as defined previously. Mobile software is a software that is executed and running on mobile devices. "User", as used herein, includes but is not limited to one or more persons, software, computers or other devices, or combinations of these.

Figure 2:
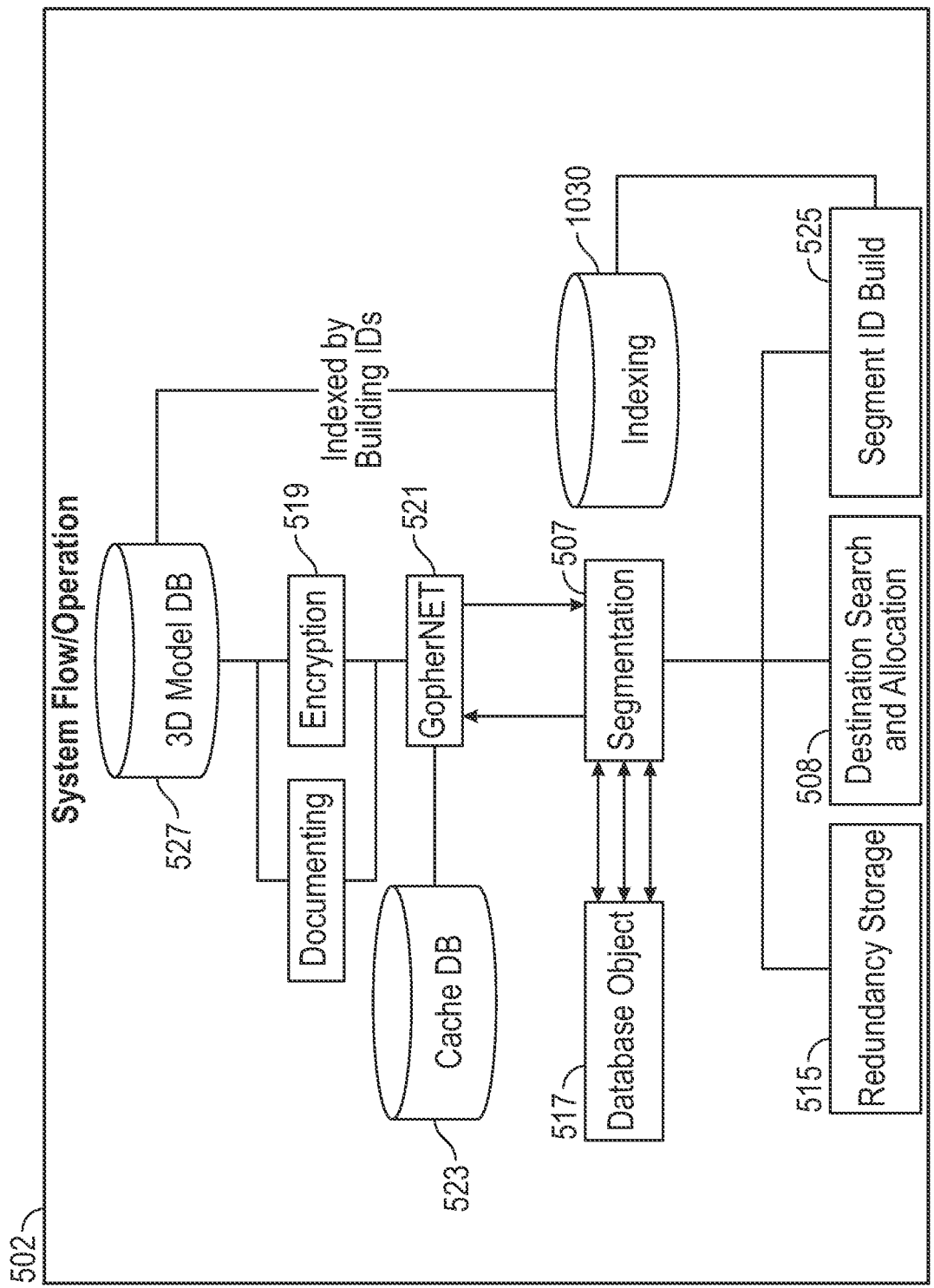
FIG. 2 is process flow diagram showing an exemplary embodiment of a mobile database management and sharing system and method in accordance with the present disclosure.

FIGS. 1 and 2 illustrate exemplary systems and methods of mobile database management and sharing, over private, secured, encrypted networks, in real time. Disclosed embodiments comprise communication devices like tracking systems, microchip-based devices, and could include any type of personal computing device such as a smartphone, tablet, etc. The database management and sharing systems discussed herein work on every computer-readable medium. At a high level, exemplary embodiments work as follows. The mobile database may store, for example, text, documents, media and/or multimedia data. As discussed in more detail herein, the mobile database may include additional logics (e.g., proxy objects) that may make the mobile database appear to provide additional functionality typically associated with a more powerful database. Exemplary embodiments recognize the database data, create database sharing requests, and communicate with other mobile devices, worldwide over a private, secured network to transfer and store part of the database item on other mobile devices.

An exemplary embodiment of a mobile database management and sharing system 500 comprises at least one mobile database 502 and one or more electronic circuits 10. The mobile database may reside on a mobile data capture device. Typically, the electronic circuits 10 will be housed in mobile devices 40. More particularly, at least one mobile database 502 and a proprietary Integrated Circuit (IC) 10 is installed within a mobile device 40. The mobile database could be of any and all types including but not limited to media, graphical, textual and secured communication information that is locally and remotely located. The media data may include one or more of digital image data, digital video data, digital voice data, and digital music data.

Figure 3:
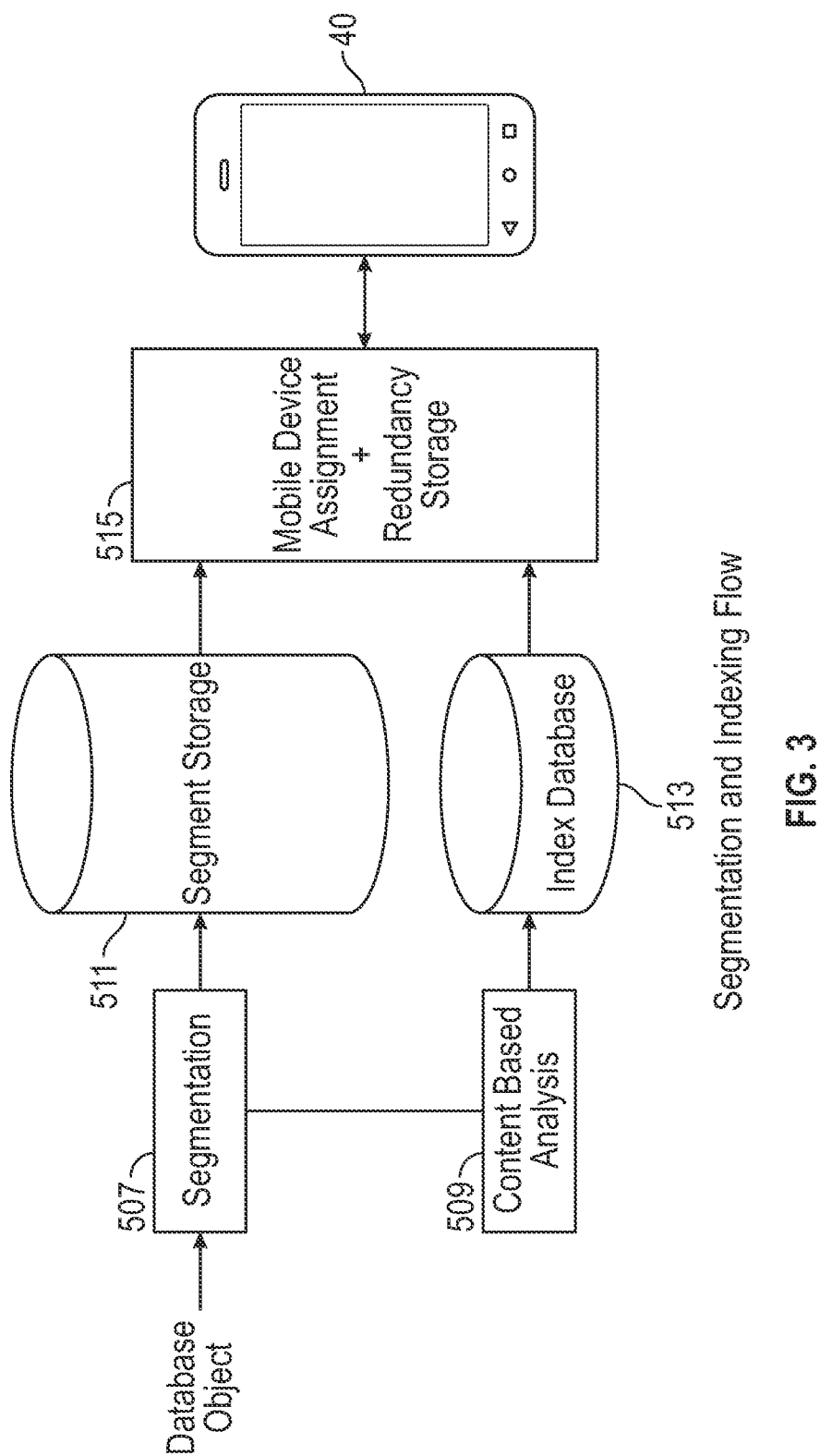
FIG. 3 is a process flow diagram showing exemplary segmentation and indexing processes in accordance with the present disclosure.
Figure 5:
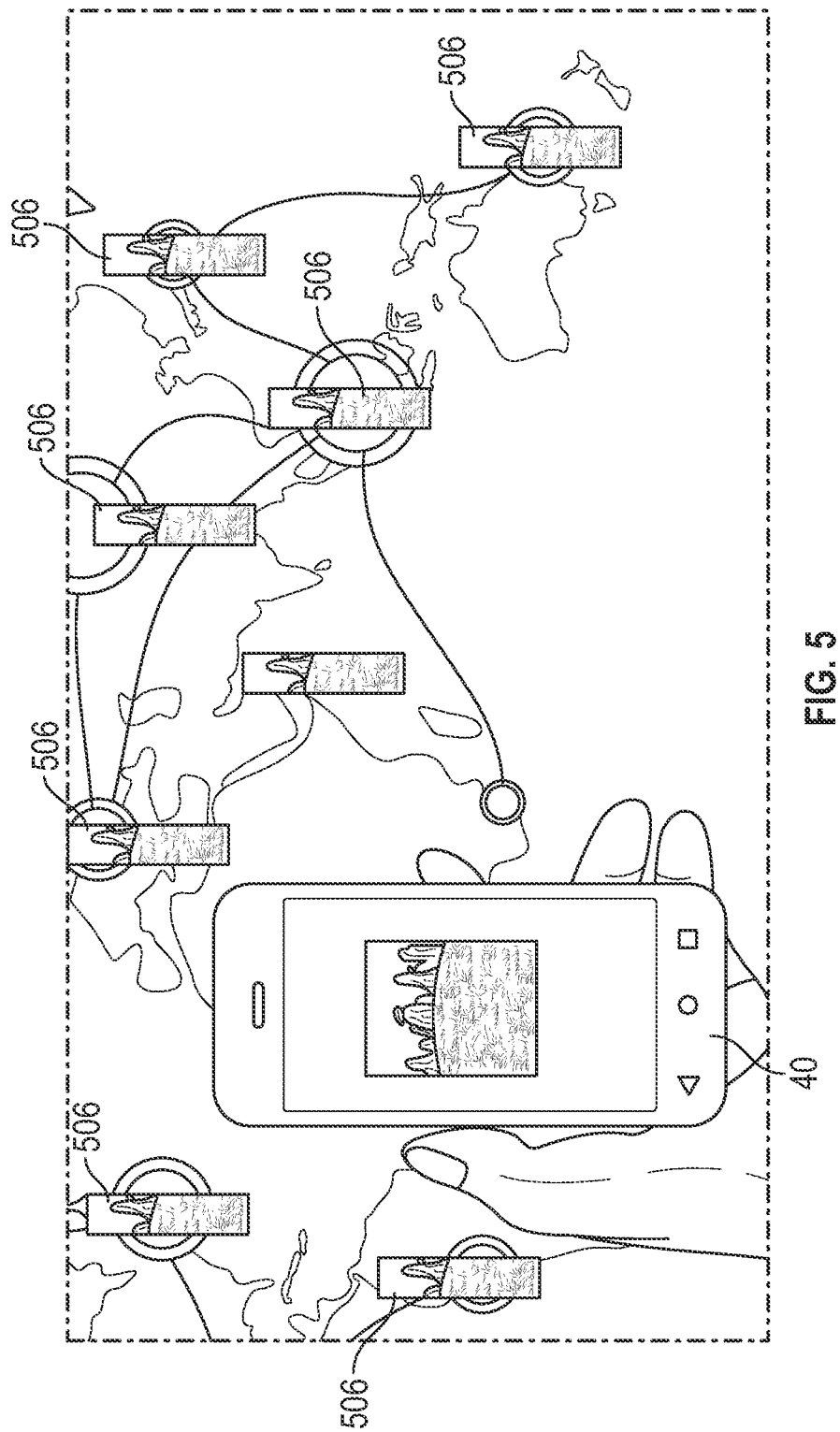
FIG. 5 is a perspective view of a mobile database management and sharing system and method in accordance with the present disclosure.

In exemplary embodiments, the system 500 includes a database management logic 504 for analyzing and processing data received from a first electronic circuit 10a housed in the mobile device 40a of a first user. The database data may be analyzed according to its size and type. As shown in FIG. 5 and the process flow diagram of FIG. 6, initially a database object or item 517 is created (step 1010). The system 500 receives a database sharing request and splits the database object or item 517 (e.g., a photo) to many segments (step 1020), which are illustrated in FIG. 5, according to an algorithm. More particularly, as shown in FIGS. 2 and 3, the mobile database management and sharing system 500 segments the mobile database 502 into a plurality of database segments 506, using its own segmentation algorithm 507, into a number of segments that is defined according to the database size and the mobile device memory. In exemplary embodiments, the database management logic indexes every database segment (step 1030). The segments may be stored in segment storage 511.

With reference again to FIGS. 2-3 and 6, the system also indexes the plurality of database segments using content-based analysis 509, builds a unique segment ID 525 for each segment, and may store the segments in a designated table on the original mobile device where the object was created (step 1030). Alternatively, or in addition to local storage, the system may send one or more database segments to a second electronic circuit over a private secured communication protocol. More particularly, the mobile application software works in conjunction with the electronic circuit 10a to index and send the database segments 506 to other proprietary electronic circuits 10 that are installed on other mobile devices 40, worldwide, transparent to their users. This may include sending a request to store the database segments on other connected mobile devices (step 1040). If another mobile device has enough space to store the database segments (step 1050), the database segment will be stored on that mobile device (step 1060). If not, that mobile device will be abandoned and mobile application software will search for another mobile device connected by the network 521 (step 1070). The database management logic may control the database segments send and receive operations asynchronously. The proprietary IC is a computing device including at least one arithmetic logic unit for executing instructions.

In exemplary embodiments, part of the database data may be stored in the local mobile device memory. The database segments 506 are encrypted and stored on one or more mobile device memories in the one or more mobile devices 40. More particularly, the database segments 506 are encrypted 519 and stored on local and other mobile devices' memories in an index database 513, worldwide and managed by the system and mobile application software worldwide. In some embodiments, redundancy storage 515 may be assigned to certain mobile devices. A cache database 523 could be maintained to hold recently accessed data and transactions so that they are not lost due to connection failure, and a 3D model database 527 also could be provided.

Exemplary embodiments have a circuit logic 508 in communication with the mobile database 502 for performing optimization of the allocation of the database segments 506. This proprietary IC logic 508 performs constant mobile device optimization in order to allocate the database segments in the most efficient way, enabling database sharing for all networked mobile devices, worldwide. For instance, the system's IC logic 508 could be to selectively queue database segments 506 delivery to other mobile devices 40, worldwide in order to achieve efficient database sharing.

Figure 7:
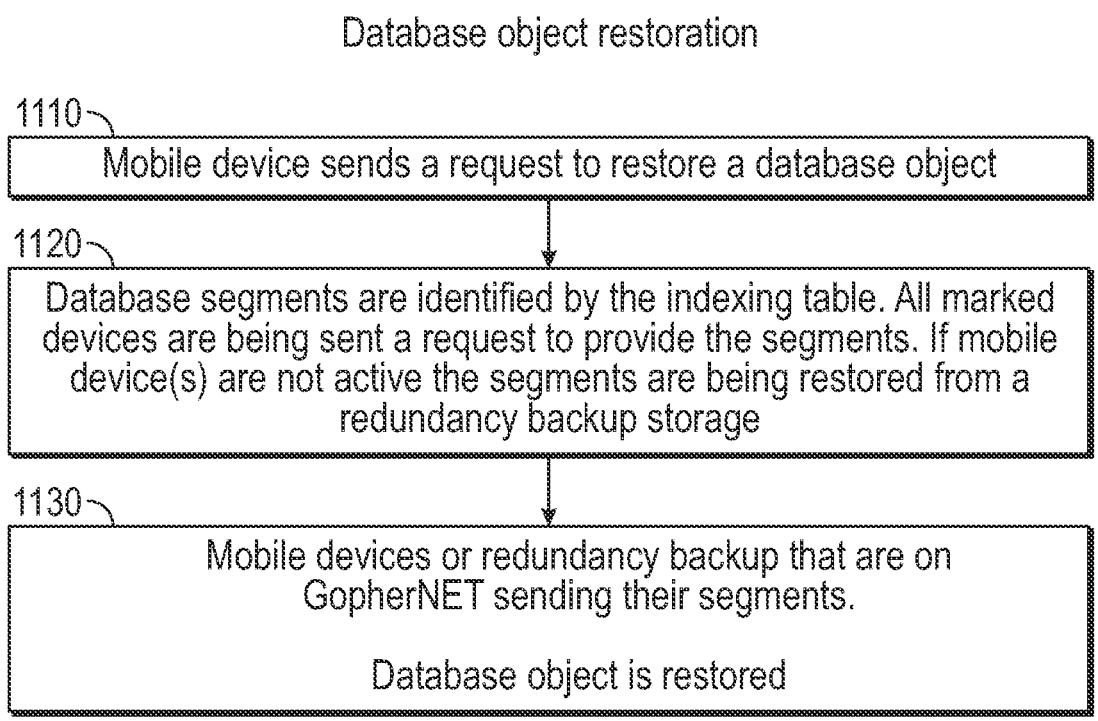
FIG. 7 is a process flow diagram showing exemplary database object restoration processes in accordance with the present disclosure.

Turning to FIG. 7, upon a user's request to retrieve or restore the database item, the mobile device sends a request to restore the item (step 1110). The system 500 collects all database segments 506 from all proprietary ICs 10, and mobile device memory, worldwide, via its private, secured, encrypted network. More particularly, in step 1120 the database segments 506 are identified by an indexing table, and all marked devices 40 are sent a request to provide the segments. If a mobile device is not active, the segment can be restored from redundancy backup storage 515. That way, either mobile devices or the redundancy backup storage on the network send their segments 506 and the database object is restored (step 1130).

In exemplary embodiments, the system 500 includes a circuit control logic 510 in communication with the mobile database 502 for adjusting database segmentation and send and receive parameters. The proprietary IC control logic 510 works in conjunction with the mobile software application to automatically adjust the database segmentation, send rate, receive rate and size according to the network and mobile service bandwidth, mobile device memory capacity and performance. The system 500 dynamically moves database segments between mobile devices 40 worldwide according to priority and proprietary IC and local mobile device memory allocations. The database segments 506 are encrypted, secured and sent to other mobile device's IC's, to be stored on the proprietary IC's memory unit and the mobile device internal memory, via private, secured network, worldwide.

Figure 8:
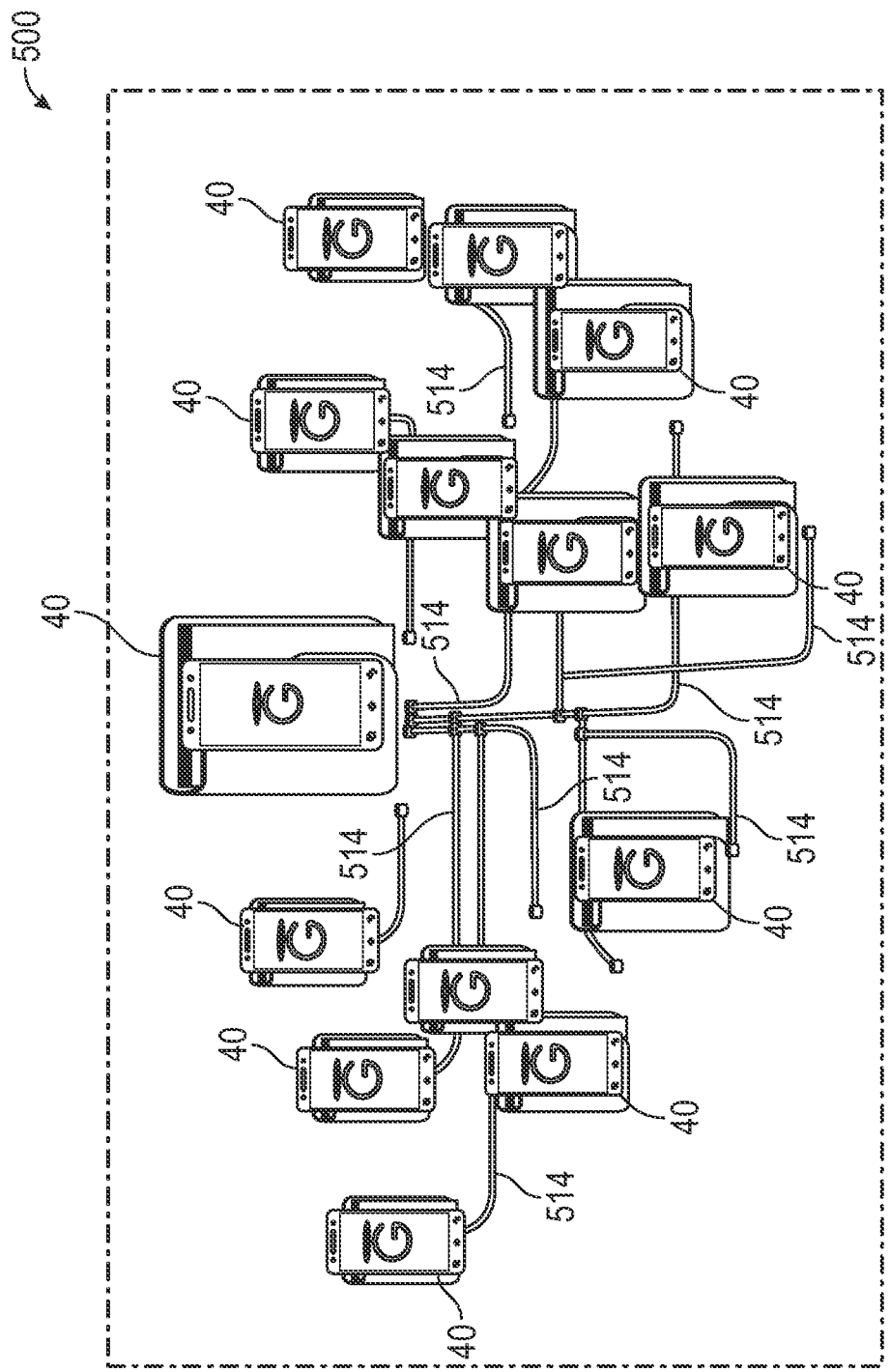
FIG. 8 is a schematic of an exemplary embodiment of a mobile database management and sharing system in accordance with the present disclosure.

Exemplary systems further comprise a database assembly logic 512 in communication with the mobile database 502. The database assembly logic 512 is configured to communicate with all mobile devices 40 to collect and assemble the mobile database 502 using one or more private channels 514 (shown in FIG. 8) in parallel with transmission of the one or more of the plurality of database segments 506. In exemplary embodiments, the system collects all segments from all mobile devices, worldwide, via private, secured network and assembles the database item on the user's mobile device. The database assembly logic 512 may be configured to update the mobile database based, at the local mobile device memory.

Figure 4:
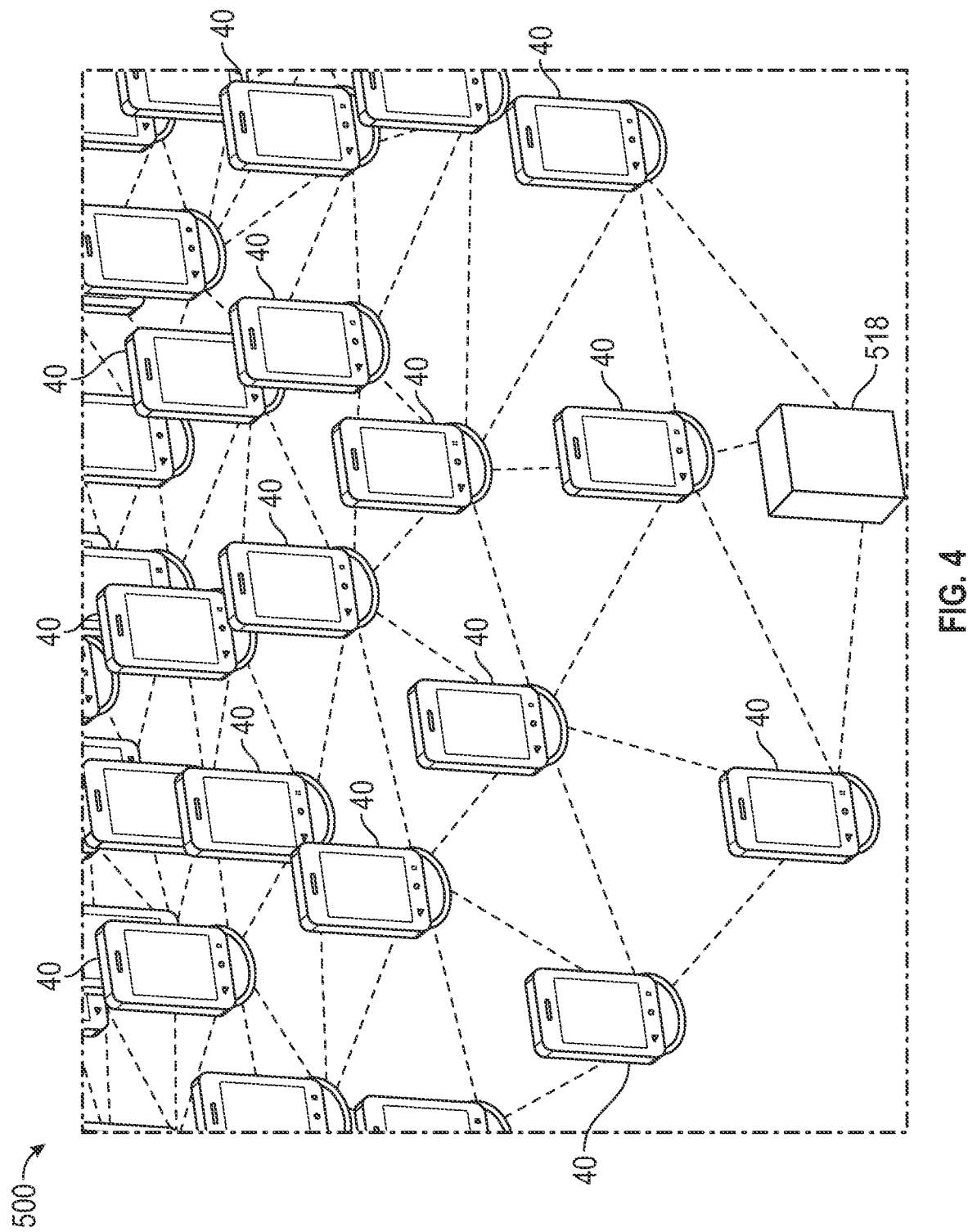
FIG. 4 is a schematic of an exemplary embodiment of a mobile database management and sharing system in accordance with the present disclosure.

In exemplary embodiments, the system 500 maintains real-time backups of all database items. For instance, the system may maintain an up-to-date backup of every database item on a central server 518. More particularly, the database management logic 504 may record all the database item's segments information in a backup table on a central server 518, via the network. In exemplary embodiments, there is back-end software running on the central server 518, shown in FIG. 4. The back-end software may include various artificial intelligence functions.

In exemplary embodiments, mobile database management and sharing system 500 includes an error protocol to identify an action success, an action failure, or a cancellation request. Upon communication of error detection the system may recover the data and repeat the segmentation, securing and sending protocol to ensure correct database data sharing.

Figure 6:
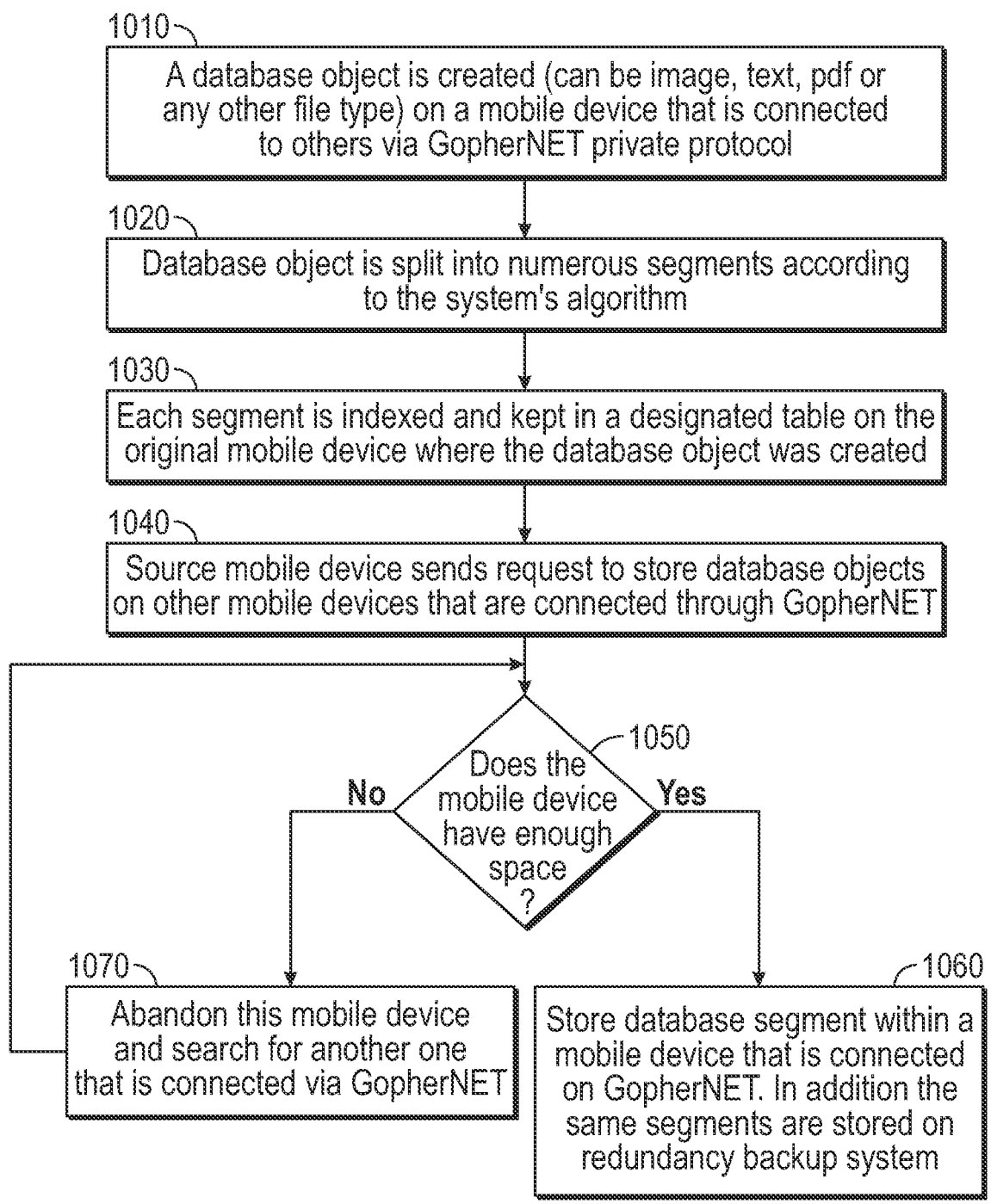
FIG. 6 is a process flow diagram showing exemplary segmentation and storage processes in accordance with the present disclosure.

In operation, exemplary mobile database management and sharing methodology, illustrated in FIG. 6, employs a computer-readable medium storing integrated circuit units' instructions that when executed by a proprietary IC cause the proprietary IC to perform actions, the executable instructions comprising instructions for generating a database sharing request 516 that relates to some type of data stored in the mobile database 502. For example, the database sharing request might request sharing of one or more particular database segments 506. The data object could be a photo album or a file, and the file could be a photo, an audio file, a video file, or a document. The metadata relating to a photo could be a location, people, or objects in the photo. In one example, upon a user's database storage request relating to a photo or a document, the proprietary IC that is working with a mobile software application invokes the database sharing request to split the database object, in our case a photo, to many segments and, as discussed in detail herein, store each database segment on other mobile device around the world.

The database sharing request 516 may be sent from one user's mobile device 40 and received by another mobile device, with each mobile device containing the same proprietary IC and mobile database management and sharing system. In exemplary embodiments, the system sends the sharing request 516 to other mobile devices 40, worldwide, to store some of the database segments on their proprietary IC and/or local memories. Next, the database sharing request 516 is processed by the mobile database 506 and there may be a subsequent step of determining or confirming that the sharing requested was processed. The database sharing request 516 could be associated with remote processing of the database data in the mobile database.

On each mobile device 40, the propriety IC 10 in conjunction with a mobile application software analyzes the proprietary IC local memory and the mobile device memory capacity and performance and approves or disproves the request according to the analysis results. If the request is not approved due to lack of memory, low performance or other reason, the request is automatically sent to other mobile devices until the necessary number of mobile devices has been achieved. These service requests are performed via private, secured, encrypted communication protocol in real time by the proprietary IC that is working in conjunction with the mobile software application. Upon approval of the database sharing request 516, the mobile device 40 stores the database segment 506 on the proprietary IC local memory and/or on the mobile device local memory.

In exemplary embodiments, the sharing request 516 is communicated to a central server 518. The central server 518 is associated with providing services to the mobile database and for transferring the database data to the central server. This communication may be done in parallel with transmitting database data to the server including the requested database segments 506. The central server 518 may then send a database sharing reply to the database sharing request 516, which would be received by the mobile device processing the request. That mobile device 40 or the central server 518 would send the requested database segments 506 to the mobile device that made the database sharing request 516. Exemplary methods also include running an error protocol and, if an error is detected, recovering data, repeating the segmentation step, and repeating the sending step.

In exemplary embodiments, database segments 506 are dynamically moved among mobile devices 40, according to proprietary IC and local mobile devices memory utilization to maintain efficient memory usage at all times. The system 500 may decide to move database segments between mobile devices according to memory capacity, mobile network bandwidth and mobile device performance. In the event of a mobile device downtime the system 500 automatically recovers the missing segments 506 from the central backup server. At all times the database management and sharing system 500 maintains a dynamic indexing and status table per each database item and its segments for real time restoration.

In exemplary embodiments, each database segment 506 is indexed according to built-in table that is created by the database management system 500 and stored on the main user's mobile device 40 that the database sharing request was sent from. The database management and sharing system is also storing some of the database item's segment in the local mobile device memory. The user's mobile device that has sent the database sharing request may store a segments indexing table with the list and location of all database item's segments, worldwide. The database data, including the requested database segments 506, may be encrypted and stored on one more mobile device memories in one or more mobile devices. The indexing table may be protected via 1024 encryption security algorithm.

In parallel the database management and sharing system 500 may save a backup of the database item on a fire-proof central server 518 for backup recovering and restoring purposes. The backup, fire-proof central servers are performing as a mirrored backup system to recover and restore the entire database item or segments at any time. The system may use the backup system in case of a mobile device down scenario.

The user may request to restore the database item 517 (e.g., a photo) and the database management system 500 will send a restoration request to all mobile devices 40 that store all the item's segments. All segments are then sent via secured, encrypted, private network protocol by the proprietary IC 10 and the mobile software application, to the user's mobile device 40 and assembled to restore the database item 517 (the photo). Since the system works in real time, the user doesn't notice the fact that the database object was stored on many mobile devices around the world and rapidly restored on the mobile device.

The mobile database management and sharing system 500 natively searches, indexes, and processes database content according to proprietary expert system algorithms. Some of these functions may be performed on the mobile device 40 on which the database item 517 is stored and some may be executed on other mobile devices' proprietary ICs, as shown in the flow diagram of FIG. 6. Implementing a database sharing request queue on the mobile device 40 and making it networked worldwide, shares the database item 517 on other mobile devices 40 while still having the physical records performed on the user's mobile device.

While the mobile database 502 and the database segments 506 may not be continuously connected, either logically and/or physically, they may be connected at times. When connected, database sharing requests queued on the mobile database 502 and executed in turn by the database management and sharing system 500, are transparent for the user. A database sharing response may selectively be provided back to the mobile database 502 by other mobile devices 40, worldwide, in turn.

Figure 9:
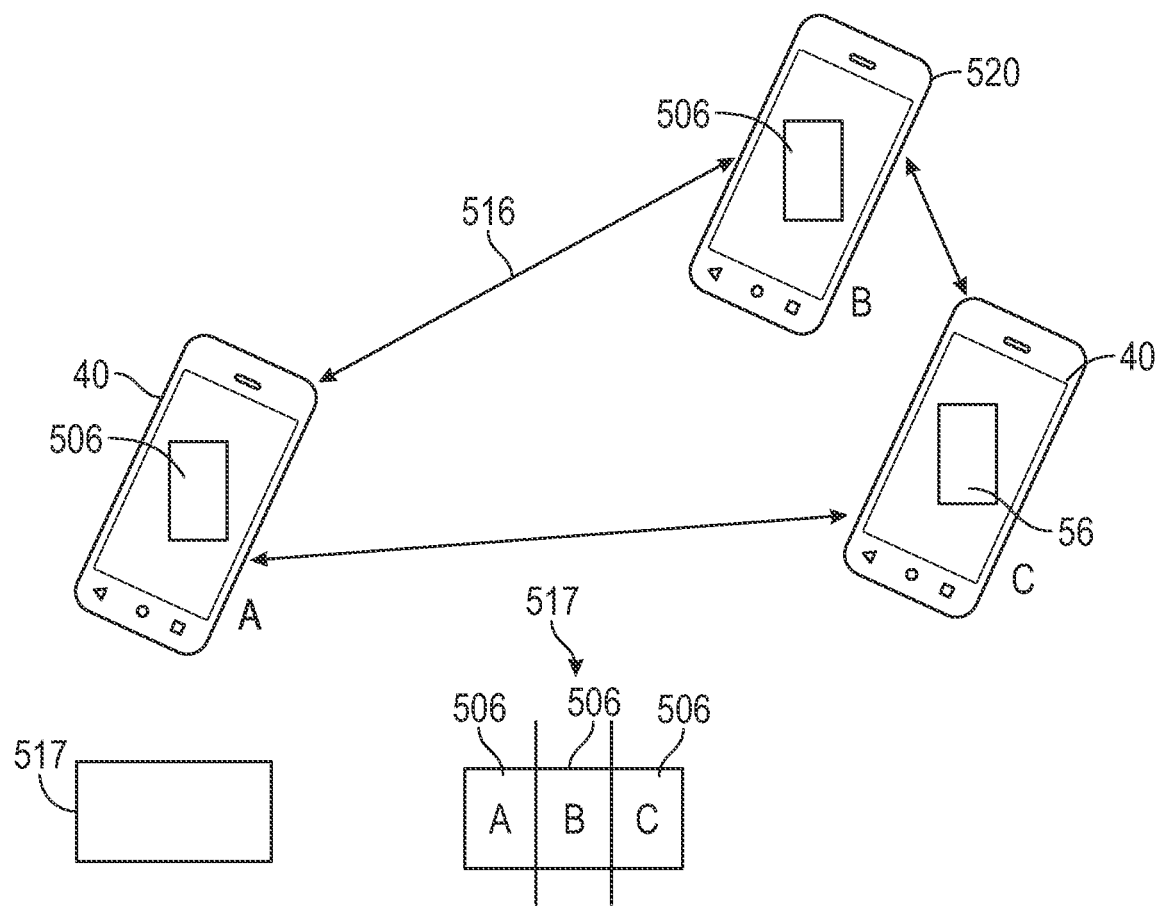
FIG. 9 is a schematic of an exemplary embodiment of a mobile database management and sharing system in accordance with the present disclosure.

In exemplary embodiments, the management and sharing methodology employs one or more proxy entities 520 related to the shared mobile database 502. Mobile devices may be configured to become proxy entities 520. As shown in FIG. 9, the mobile database 502 or database segments 506 are sent via mobile devices 40 as each one of them functions as a proxy between mobile devices 40 creating a MESH network. More particularly, one or more of the requested database segments 506 are sent via one or more mobile devices' proxy entities 520 to one or more separate mobile devices 40. All mobile devices are transferring segments between themselves. The database segments may be stored in the sending mobile device, the one or more separate mobile devices, as well as on a central server 518 or backup for redundancy purposes. In exemplary embodiments, each mobile device serves as a proxy entity 520 for others maintaining processing requests in a queue. More particularly, the database storage and sharing request is placed in a queue on mobile devices 40. The proxy entities 520, which may be mobile devices, then determine that the database processing request is performed by a mobile device and, in response, generate a database sharing request, which may be associated with a media, textual or other electronic form processing request.

Exemplary methods may include determining whether to handle the database storage and sharing request locally, and/or globally over other mobile devices, worldwide and transfer the database storage request to all selected mobile devices via private, secured communication protocol. A media service request may be transferred to multiple mobile devices 40 so they work in conjunction, in real time, to store the requested database item. The mobile devices may then send a database storage reply that includes results to the database storage and sharing request and provide a response to the database sharing request where the response is based, at least in part on the database sharing reply.

Exemplary methods, illustrated in FIGS. 2, 3, 6 and 7, include receiving at the mobile database 502 a storage request from a mobile device 40, receiving at the mobile database segments data from the user's mobile database, and starting a transaction. The methods may further include processing the database sharing request on database segments data on selected other mobile devices' memory and proprietary IC to spread the database item on many mobile devices, worldwide. The shared mobile database 502 may contain a partial database of a whole database contained and managed via the database management and sharing methodology. In addition, the shared mobile database 502 may be configured to be stored as segments 506 on many mobile devices' 40 local memories and on a central server 518. Exemplary methods include the step of generating an indexing table for all database segments that is accessible to all selected mobile devices through a direct, private, secured communicating protocol and channel.

In exemplary embodiments, the executable instructions of the computer-readable medium include instructions for starting a first transaction before generating the database sharing and storing request and ending the first transaction after generating the database sharing request. Alternatively, the instructions may be for starting a first transaction before receiving the database assembly processing request and ending the first transaction after processing the database assembly reply. In addition, there may be instructions for starting a second transaction before processing the database sharing and storing reply, processing the database storage reply, and ending the second transaction after processing the database sharing reply. Instructions could also be for providing an assembly request to the mobile database based, at least in part, on the database assembly reply, and generating a sequence of database assembly requests and a response to the assembly request.

Mobile database management and sharing methodology may further include quality control or error detection and correction mechanisms. For example, methods may further comprise determining that a mobile database segment 506 or other data item 517 may be out of synchronization between the mobile database 502 and the other mobile devices database. If the data item is determined to be out of sync, then there is a step of automatically configuring the database transmission reply as a reconciliation, fixing request and waiting for a reconciliation response associated with the correction reply configured as a correction request. The correction may be processed in real time in to overcome communication errors.

As mentioned above, exemplary mobile database management and sharing systems utilize local, mobile and/or cloud software in communication with the systems. In exemplary embodiments, a mobile software application manages database sharing and storage instructions in conjunction with a proprietary IC. When executed by the proprietary IC, the mobile app instructions cause the proprietary IC 10 to perform certain actions. For example, the instructions set may comprise instructions configured for many of the steps described above. These include, but are not limited to, receiving a database storage request to perform a function by a mobile device 40 that includes a mobile database 502. The mobile database 502 may act as a proxy for the database item sharing and contain a partial database of a whole database contained and managed by the database sharing management system 500. The steps further include queuing the database storage request in a queue on the mobile device, determining whether to handle the database storage request locally, at the mobile database, and/or to transfer the database storage request to other mobile devices proprietary ICs and their local memory database. This determination is based, at least in part, on whether the function can be performed on the partial database.

The steps may further include transferring the database storage request from the queue to the database management system for segmentation of the whole database and sending it to designated mobile devices worldwide in response to a determination that the database storage request is performed on the partial database. Then the steps include receiving a result, from the entire database, in response to the function being performed such that it appears that the function is performed by the mobile database. The mobile app may also provide instructions for recognizing database data stored by the mobile device and other mobile devices and spreading the database segments through the proxy to other mobile devices to be stored on their proprietary IC and local memory, according to indexing setup.

In exemplary mobile app software, the determining step is further based, at least in part, on the proprietary IC configuration, a software configuration, a ratio of computing power, a load ratio, a communication bandwidth, and/or a security measure. The communication with the proprietary IC and all other mobile devices' proprietary ICs may be based on handshaking protocol for error correction. In exemplary embodiments, the function of the mobile devices' search and selection query is directed to be performed on content in the mobile devices database, worldwide, which when executed, a dynamic of mobile devices are selected according to their free local memory size, communication bandwidth and performance. In exemplary embodiments, the database storage and sharing request is a search request and the function is a search function to find dynamically mobile devices that are running the same system to perform the database storage and sharing request locally.

As discussed above, exemplary systems and methods include one or more communication devices 40. A communication device 40 comprises an electronic circuit 10. Any type of electronic circuit or microchip could be used and configured as described herein, including but not limited to, a low noise amplifier (LNA) type circuit, a customized voltage-controlled oscillator (VCO) type circuit, a phase locked loop (PLL) type circuit, a low pass filter (LPF) type circuit, a notch filter type circuit, and/or a serializer and de-serializer (SERDES) type circuit. Proprietary electronic circuits are described in co-pending application Ser. No. 15/015,441, filed Feb. 4, 2016, which is hereby incorporated by reference in its entirety.

Figure 10:
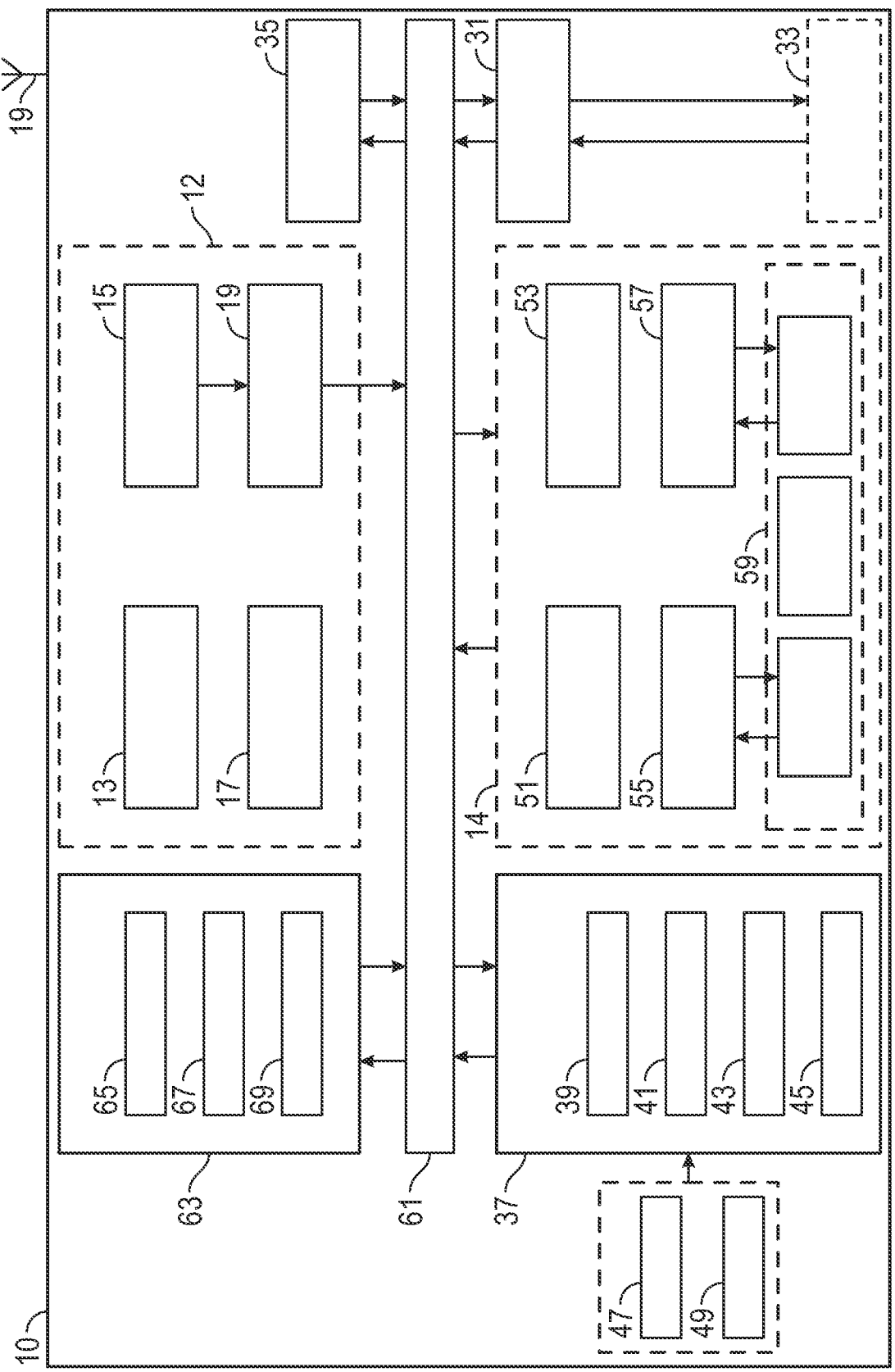
FIG. 10 is a schematic of an exemplary embodiment of an electronic circuit in accordance with the present disclosure.

Referring to FIG. 10, an exemplary electronic circuit 10 comprises a process subsystem 12 including a compliance circuit 13, a microprocessor 15, an interrupt controller 17, and a bridge 19. The electronic circuit 10 further comprises a control block 37 including a clock manager 39, a reset manager 41, a power manager 43, and a system control 45. The electronic circuit also has a crypto-block 14 including a master sub-block 51, a slave sub-block 53, a direct memory access circuit 55, a packet buffer 57, and one or more crypto-engines 59. An interconnect 61 communicatively connects the process subsystem 12 to the control block 37 and the crypto-block 14. The interconnect circuit 61 serves as a general interface to the various sub-blocks of the electronic circuit 10.

The electronic circuit 10 may include one or more network connections that can communicatively connect the electronic circuit to a public network of computers, which could be linked by the internet. One of the network connections can communicatively connect the electronic circuit 10 to a private network of computers, separate and distinct from the public network. The electronic circuit 10 may include a memory unit/controller 31 comprised of a memory controller circuit. An external memory interface 33 may be in communication with the memory unit 31 via a memory interface port. In exemplary embodiments, the electronic circuit 10 may further comprise a radio unit 83 (shown in FIG. 13) and an antenna 19 embedded within the electronic circuit and/or located outside the electronic circuit and communicatively connected to the electronic circuit.

Exemplary electronic circuit architecture may be arranged to have some forms of a public unit and a private unit. A barrier may be located between the public unit and the private unit. The public unit may include a network connection that can communicatively connect the electronic circuit 10 to a public network of computers, which could be linked by the internet. A second network connection may be located within the private unit. The second network connection can communicatively connect the electronic circuit 10 to a private network of computers, separate and distinct from the public network. The network connections can be wireless or wired connections. For additional security, the second network connection may be a wired connection to the private network, and the private unit may also be configured so it cannot connect to the internet. In exemplary embodiments, the private unit is not connected to the internet and the public unit is connected to the internet.

A barrier may be located between the public and private units, sub-blocks, or groups of sub-blocks. It should be noted that the barrier is not necessarily located physically between the two units, sub-blocks, or groups of sub-blocks; rather, it stands between them for communication purposes, separating the private unit from the public unit for security while at appropriate times serving as an interconnect to communicatively connect the two units. The barrier may also separate the first and second network connections. More particularly, the barrier may be an inner hardware-based access barrier or inner hardware-based firewall. An exemplary barrier has a signal interruption mechanism to prevent communications between the private and public units, sub-blocks, or groups of sub-blocks when necessary or desirable. In exemplary embodiments, the signal interruption mechanism is a bus having an on/off switch that controls communication input and output.

In exemplary embodiments an electronic circuit 10 forms an integral part of mobile database management and sharing system 500 comprising one or more personal computing devices 40. In exemplary systems, each personal computing device 40 houses an electronic circuit 10. More particularly, the electronic circuit or microchip 10 can be embedded within a mobile device's existing microchip or installed within a mobile device's electronic board, as an integral part of the system, and be configured to operate as a specific purpose electronic circuit or microchip. Alternatively, the electronic circuit or microchip 10 could be part of a complete, independent computer system within a mobile device. In FIG. 2, satellite communications are represented by solid lines and electronic circuit communications by dashed lines.

In exemplary embodiments, the communication device is a tracking device. With reference to FIGS. 11-14, exemplary embodiments of a tracking device 200 comprise a package 202 with an electronic circuit 10 embedded therein. The package 202, also referred to as a "patch" or patch package, may be made of or coated with a sticky material so its outer surface is sticky. The patch package 202 is made of a flexible and lightweight but rugged material such as a polymer-based or plastic material or any other material that provides both flexibility and strength. In exemplary embodiments, the patch package 202 is made of a material that is waterproof and otherwise weatherproof so it is not damaged in inclement weather and protects the electronic circuit 10 and other electronics contained in the device 200.

The stickiness of the package 202 advantageously serves to enable the tracking device 200 to be affixed to an object as a patch product which can track the object anywhere. As described in more detail herein, when activated by pressing the start button 203, the electronic circuit 10 within the tracking device 200 transmits signals to enable tracking of the device's location anywhere on Earth. As best seen in FIGS. 3A and 3B, an affix sensor 204 may be provided with the tracking device 200. The affix sensor 204 is an advanced circuitry including an affix circuit 217 that controls the device's mounting and removal responses and may be integrated with the electronic circuit 10 or a separate component in communication with the electronic circuit 10.

Advantageously, the affix sensor 204 determines whether the tracking device 200 is affixed to the object to be tracked, and in exemplary embodiments the tracking device automatically turns on when affixed to an object. In exemplary embodiments, the "peel-and-stick" sensor system includes an adhesive 205 to stick to an object and pressure sensors 211 and conductivity sensors that detect application to the object and start the device's operation. It will stay on that object for the rest of the device's life and, once attached to an object, an internal clock starts to work. The clock has several tasks, one of which is determining the device's lifetime. Advantageously, the affix sensor can also determine if the device 200 gets removed from the object.

Figure 11:
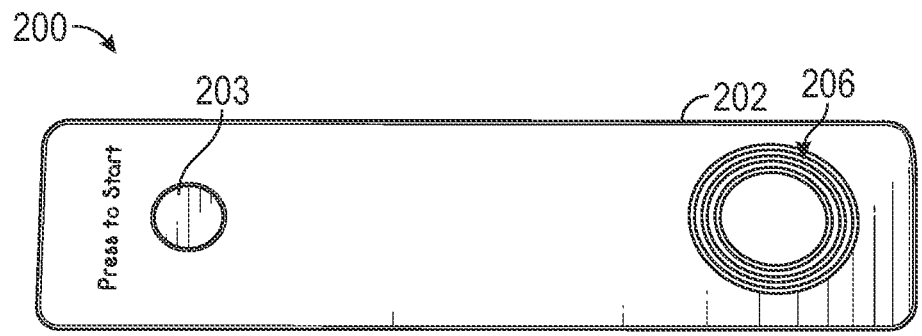
FIG. 11 is a perspective view of an exemplary embodiment of tracking device in accordance with the present disclosure.
Figure 12:
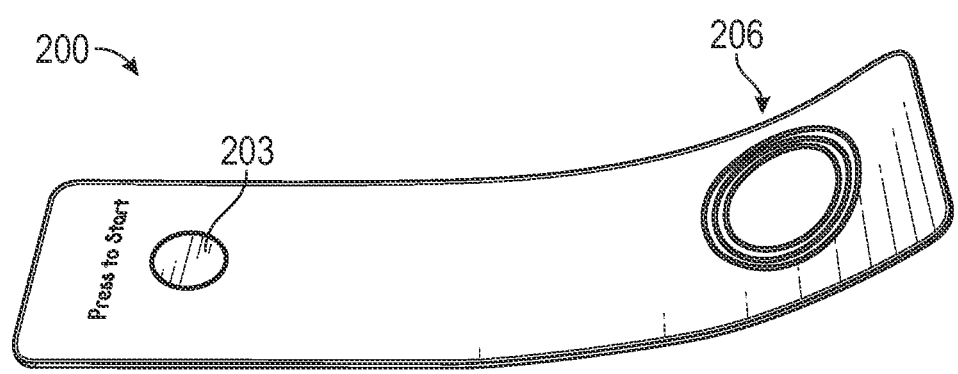
FIG. 12 is a perspective view of an exemplary embodiment of a tracking device in accordance with the present disclosure.
Figure 13:
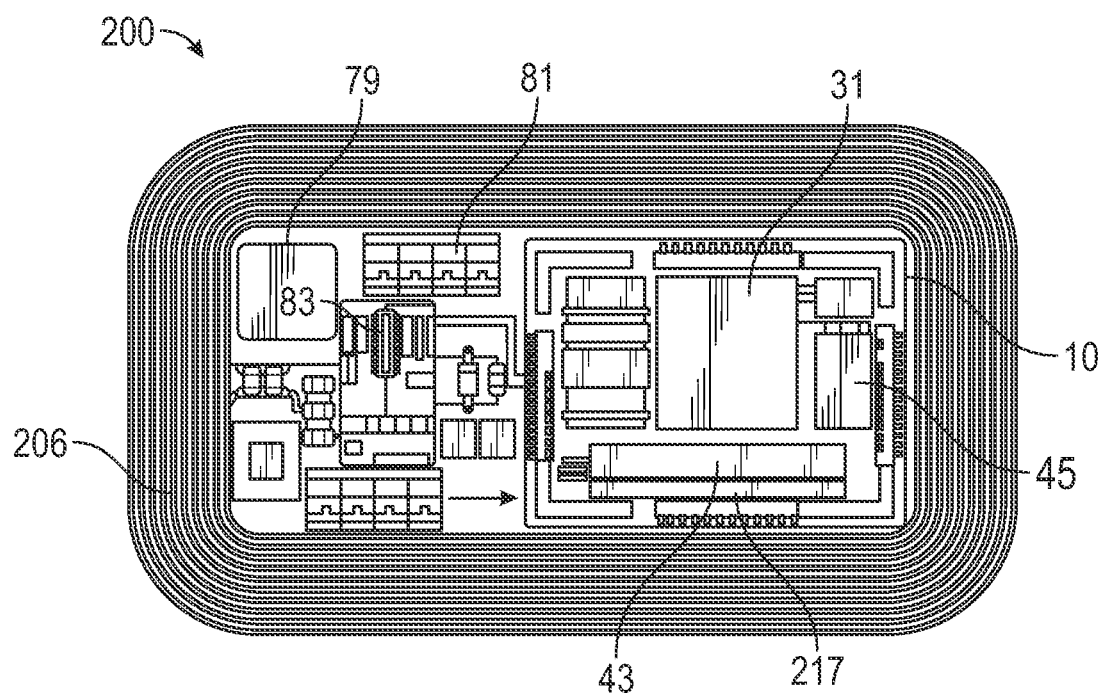
FIG. 13 is an exploded view of an exemplary embodiment of a tracking device in accordance with the present disclosure.
Figure 14:
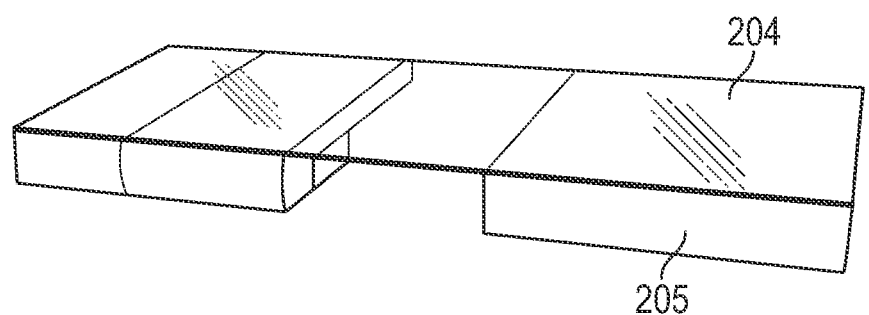
FIG. 14 is a perspective view of an exemplary embodiment of an affix sensor in accordance with the present disclosure.

As shown in FIGS. 11-13, the tracking device 200 also includes an antenna 206 to facilitate communications. More particularly, the tracking device 200 may include an antenna 206 and control circuitry configured to control transmission and receipt of broadband information to and from the antenna 206. Antenna 206 may be integrated with the electronic circuit 10 or be a separate component in communication with the electronic circuit 10. The antenna may be any form or type of antenna such as a wire antenna 206 or a ball antenna. The ball-based structure advantageously provides more power in a miniature antenna structure for use with various wave lengths in smaller scales.

Thus, it is seen that systems and methods of mobile database management and sharing are provided. It should be understood that any of the foregoing configurations and specialized components or connections may be interchangeably used with any of the systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A mobile database management and sharing system, comprising:
    at least one mobile database containing a partial database of a whole database;
    a first electronic circuit in communication with the mobile database, the electronic circuit including a microprocessor, a controller, a secured basic input/output (BIOS) system, a memory unit, a radio unit, and an antenna; and
    a circuit logic in communication with the mobile database;
    wherein the system segments the mobile database into a plurality of database segments;
    wherein the system indexes the plurality of database segments;
    wherein the circuit logic performs optimization of allocation of the plurality of database segments including sending a request to store the plurality of database segments on other connected mobile devices, each mobile device having an electronic circuit, and if a second mobile device has enough space to store the plurality of database segments, selectively queueing database segments delivery to a second electronic circuit in the second mobile device;
    wherein if the second mobile device does not have enough space to store the plurality of database segments, the circuit logic abandons the second mobile device and searches for another mobile device to store the plurality of database segments; and
    wherein the system sends one or more of the plurality of database segments to the second electronic circuit or another electronic circuit over a private secured communication protocol.

2. The system of claim 1 wherein one or both of the first and second electronic circuit is an integrated circuit.

3. The system of claim 1 wherein one or both of the first and second electronic circuit is housed within one or more mobile devices.

4. The system of claim 3 wherein the plurality of database segments is encrypted and stored on one more mobile device memories in the one or more mobile devices.

5. The system of claim 3 further comprising a database assembly logic in communication with the mobile database configured to communicate with the one or more mobile devices to collect and assemble the mobile database using one or more private channels in parallel to sending the one or more of the plurality of database segments.

6. The system of claim 1 further comprising a database management logic in communication with the mobile database for analyzing and processing data received from the first electronic circuit.

7. The system of claim 1 further comprising cloud software in communication with the system.

8. A method of mobile database management and sharing, comprising:
    processing data received from at least one mobile device containing at least one electronic circuit including a microprocessor;
    segmenting a mobile database into a plurality of database segments;
    indexing the plurality of database segments;
    processing a database sharing request received from at least one mobile device, the database sharing request requesting sharing of one or more of the plurality of database segments;
    sending the one or more of the plurality of database segments requested to at least one mobile device over a private secured communication protocol;

storing the one or more of the plurality of database segments in a plurality of mobile devices and in redundancy backup storage;

sending a restoration request to the plurality of mobile devices storing the one or more of the plurality of database segments; and restoring the one or more of the plurality of database segments from the plurality of mobile devices or from the redundancy backup storage if the at least one mobile device is not active.

9. The method of claim 8 further comprising communicating the database sharing request to a central server.

10. The method of claim 9 further comprising communicating database data to the central server in parallel with the database sharing request.

11. The method of claim 9 further comprising receiving a reply to the database sharing request from the central server.

12. The method of claim 8 further comprising running back-end software on a central server.

13. The method of claim 12 wherein the back-end software includes artificial intelligence.

14. The method of claim 8 further comprising running an error protocol.

15. The method of claim 14 further comprising detecting an error, recovering data, repeating the segmentation step, and repeating the sending step.

16. A mobile database management and sharing system, comprising:

a first mobile database;

a first electronic circuit in communication with the mobile database, the electronic circuit including a microprocessor, a controller, a secured basic input/output (BIOS) system, a memory unit, a radio unit, and an antenna;

wherein the system segments the mobile database into a plurality of database segments and indexes the plurality of database segments;

wherein the system sends one or more of the plurality of database segments to a second electronic circuit over a private secured communication protocol, the second electronic circuit being in communication with a second mobile database;

wherein the system is configured to exercise quality control including determining whether a mobile database segment is out of synchronization between the first mobile database and the second mobile database;

wherein the system determines whether a mobile database segment is out of synchronization between the first mobile database and the second mobile database based on a database transmission reply; and wherein if the mobile database segment is out of synchronization, the system automatically configures the database transmission reply as a reconciliation fixing request.

17. The system of claim 16 wherein the system corrects synchronization between the first mobile database and the second mobile database in real time.

* * * * *